United States Patent [19]

Denvir

[11] Patent Number: 5,352,008
[45] Date of Patent: Oct. 4, 1994

[54] TURBULENCE-REDUCING TRUCK TAILGATE APPARATUS

[76] Inventor: John M. Denvir, HCR 33, Box 181-C, West Tremont, Me. 04690

[21] Appl. No.: 99,475

[22] Filed: Jul. 30, 1993

[51] Int. Cl.⁵ .............................................. B62D 35/00
[52] U.S. Cl. ........................................ 296/50; 296/56; 296/180.1
[58] Field of Search .................................... 296/50–53, 296/56, 180.1, 180.5

[56] References Cited

U.S. PATENT DOCUMENTS

| | | | |
|---|---|---|---|
| 4,165,118 | 8/1979 | Jensen | 296/50 |
| 4,475,759 | 10/1984 | Wine | 296/50 X |
| 4,585,265 | 4/1986 | Mader | 296/56 |
| 4,652,035 | 3/1987 | Austin, Jr. | 296/56 |
| 4,867,499 | 9/1989 | Stephan et al. | 296/180.1 X |
| 4,902,066 | 2/1990 | Norman | 296/180.1 |
| 4,932,705 | 6/1990 | Miller | 296/180.1 X |
| 5,039,154 | 8/1991 | Lewis | 296/52 |
| 5,236,242 | 8/1993 | Seeman | 296/180.1 |

FOREIGN PATENT DOCUMENTS

4027678  1/1992  Japan ..................... 296/50

*Primary Examiner*—Dean J. Kramer
*Attorney, Agent, or Firm*—E. Michael Combs

[57] ABSTRACT

A tailgate plate is arranged for displacement from a vertical position extending over an entrance opening of a vehicular truck bed, wherein the tailgate is arranged for displacement to a second position orthogonally and forwardly oriented relative to the first position permitting access of air movement through the entrance opening of the truck bed to improve aerodynamics and increase the fuel efficiency of the truck, and wherein the tailgate is arranged for displacement to a third position orthogonally and rearwardly oriented relative to the first position and in the same plane as the truck bed floor, allowing cargo to be loaded and unloaded in the accustomed manner.

10 Claims, 7 Drawing Sheets

TURBULENCE-REDUCING TRUCK TAILGATE APPARATUS

BACKGROUND OF THE INVENTION

1. Field of the Invention

The field of invention relates to tailgate structure, and more particularly pertains to a new and improved turbulence-reducing truck tailgate apparatus wherein the same is directed to the displacement of a truck tailgate to improve directional flow of air relative to the tailgate and truck bed minimizing turbulence and aerodynamic "drag", thereby increasing the fuel efficiency of the truck in use, without compromising the customary use of the truck for hauling widely varied types of cargo.

2. Description of the Prior Art

Truck tailgate structure of various types have been utilized throughout the prior art such as exemplified in U.S. Pat. Nos. 4,902,066; 4,932,705; 4,867,499; and 4,165,118.

One of the drawbacks of the tailgate structures described in the cited prior art is that they require the removal of the truck's original tailgate, which is designed for heavy use in loading and unloading cargo. In place of the original tailgate is put a tailgate apparatus which, while somewhat improving airflow, at the same time makes loading and unloading the truck bed more difficult. This increased difficulty puts new restrictions on the use of the cargo-carrying function of the truck. Further, some of the structures shown in the prior art appear as if they would easily be damaged by normal loading and unloading procedures.

SUMMARY OF THE INVENTION

In view of the foregoing disadvantages inherent in the known types of tailgate apparatus now present in the prior art, the present invention provides a turbulence-reducing truck tailgate apparatus providing a solid surfaced truck tailgate arranged for displacement from a first orthogonal position to a second position to permit air flow, as well as a third position to aid in normal loading and unloading. As such, the general purpose of the present invention, which will be described subsequently in greater detail, is to provide a new and improved turbulence-reducing truck tailgate apparatus which has most of the advantages of the prior art tailgate apparatus and which does not compromise the use of the truck as a cargo-hauler.

To attain this, the present invention provides a solid surfaced tailgate plate arranged for displacement from a vertical position extending over an entrance opening of a vehicular truck bed, wherein the tailgate is arranged for displacement to a second position orthogonally and forwardly oriented relative to the first position permitting access of air movement through the entrance opening of the truck bed to improve aerodynamics and increase the fuel efficiency of the truck, and wherein the tailgate is arranged for displacement to a third position orthogonally and rearwardly oriented to the first position and in the same plane as the truck bed floor, allowing cargo to be loaded and unloaded in the accustomed manner.

My invention resides not in any one of these features per se, but rather in the particular combination of all of them herein disclosed and claimed and it is distinguished from the prior art in this particular combination of all of its structures for the functions specified.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the following abstract is to enable the U.S. Patent and Trademark Office and the public generally, and especially the scientists, engineers and practitioners in the are who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved turbulence-reducing tailgate apparatus which has most of the advantages of the prior art tailgate apparatus and which does not compromise the use of the truck as a cargo-hauler.

It is another object of the present invention to provide a new and improved turbulence-reducing truck tailgate apparatus which retains all of the functions and uses of a conventional truck tailgate to which the buying public is accustomed, while also facillitating the reduction of aerodynamic "drag", thereby aiding in increasing the fuel-efficiency and MPG rating of the truck for both the truck manufacturer and the buying public.

It is another object of the present invention to provide new and improved turbulence-reducing truck tailgate apparatus which retains the appearance and all of the functions of a conventional truck tailgate to which the buying public is accustomed, thereby making such turbulence-reducing tailgate attractive to truck manufacturers for use as original equipment on the trucks that such manufacturers produce and sell.

It is another object of the present invention to provide a new and improved turbulence-reducing truck tailgate apparatus which may be easily and efficiently manufactured and marketed.

It is a further object of the present invention to provide a new and improved turbulence-reducing truck tailgate apparatus which is of a durable and reliable construction.

An even further object of the present invention is to provide a new and improved turbulence-reducing truck tailgate apparatus which is susceptible of a low cost of manufacture with regard to both materials and labor, and which accordingly is then susceptible of low prices of sale to the consuming public, thereby making such turbulence-reducing tailgate apparatus economically available to the buying public.

Still yet another object of the present invention is to provide a new and improved turbulence-reducing-truck tailgate apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 to 9 thereof, a new and improved turbulence-reducing truck tailgate apparatus embodying the principles and concepts of the present invention and generally designated by the reference numeral 10 will be described.

Figure 1:
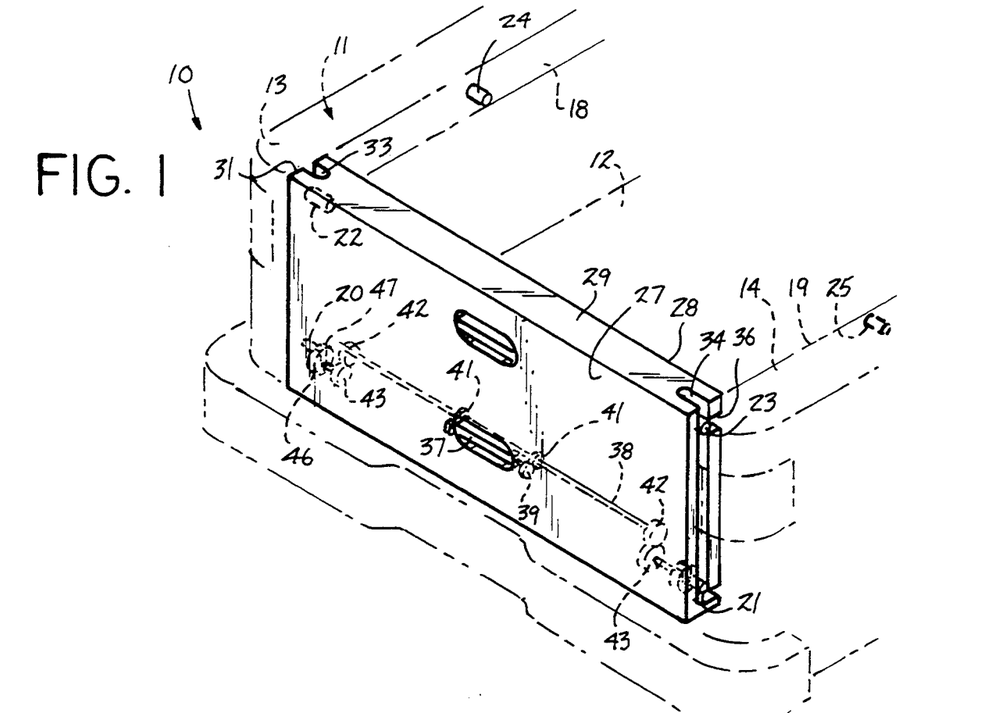
FIG. 1 is an isometric illustration of the invention in a first position.
Figure 2:
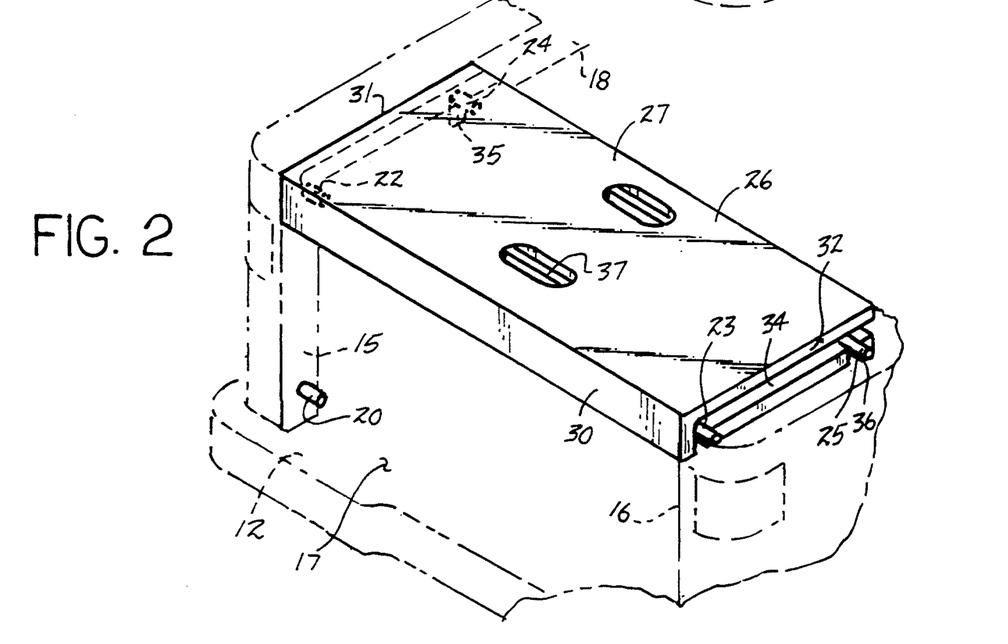
FIG. 2 is an isometric illustration of the invention in a second position.
Figure 3:
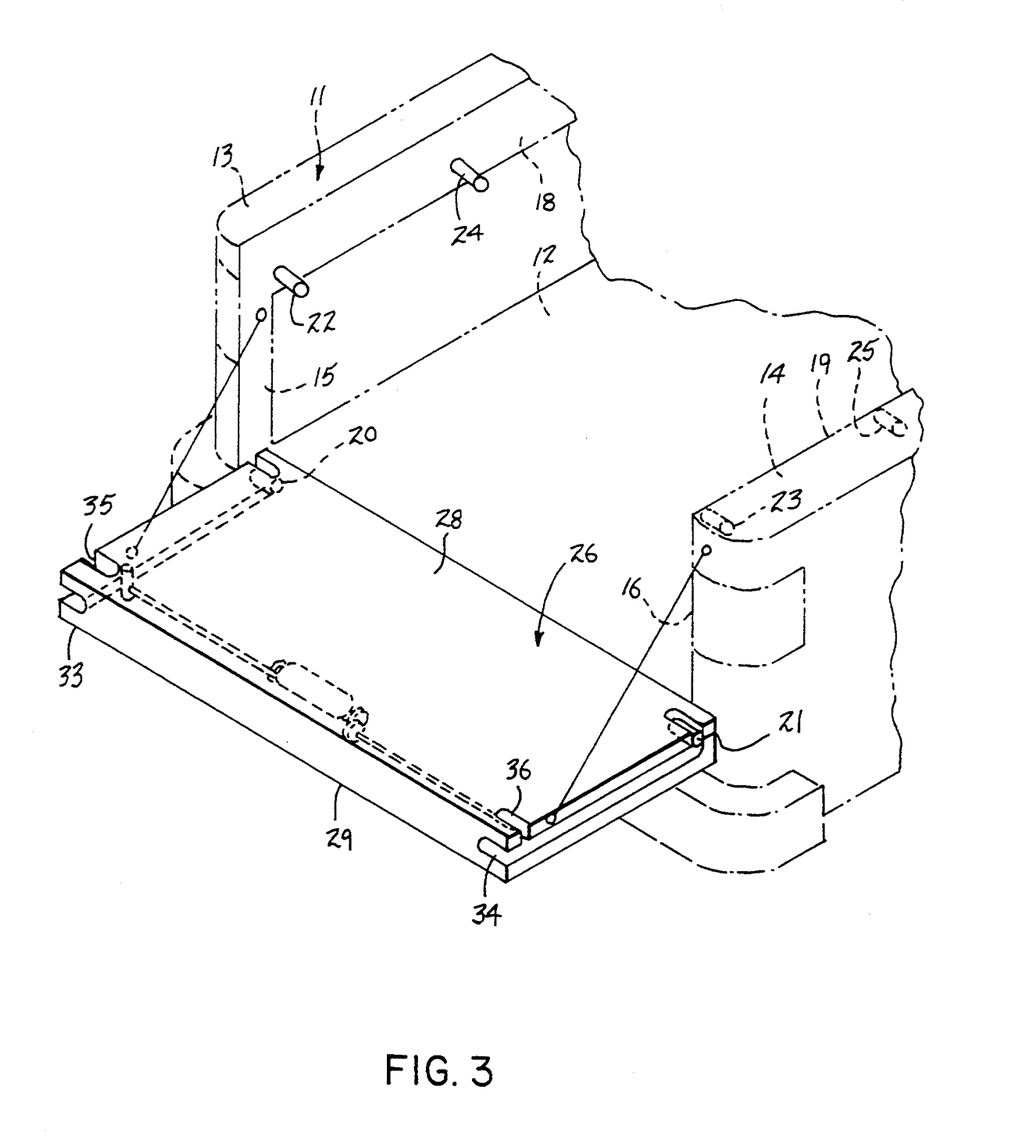
FIG. 3 is an isometric illustration of the invention in a third position.
Figure 4:
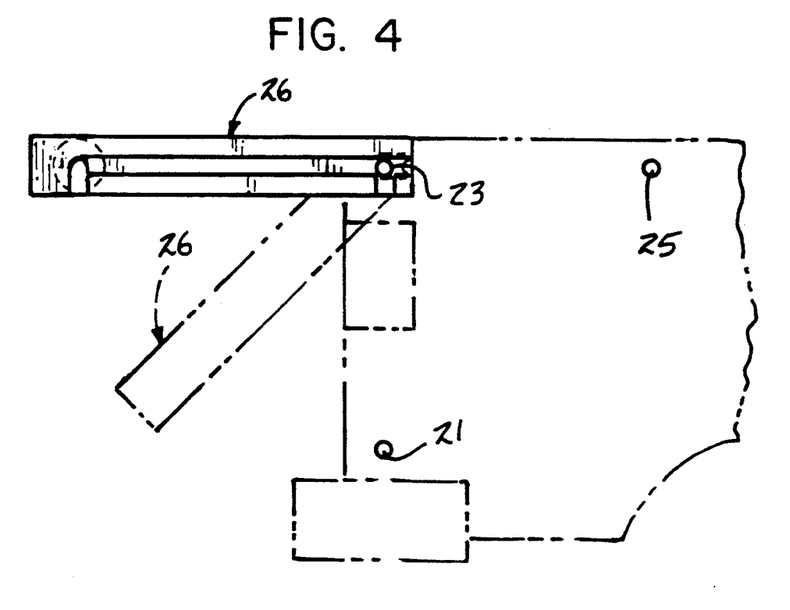
FIG. 4 is an orthographic view indicating the displacement of the tailgate from the first position to the second position.
Figure 5:
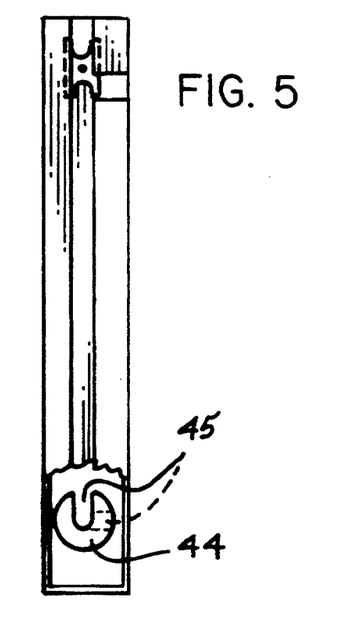
FIG. 5 is an orthographic partial broken-away view indicating the rotary lock plate structure.
Figure 6:
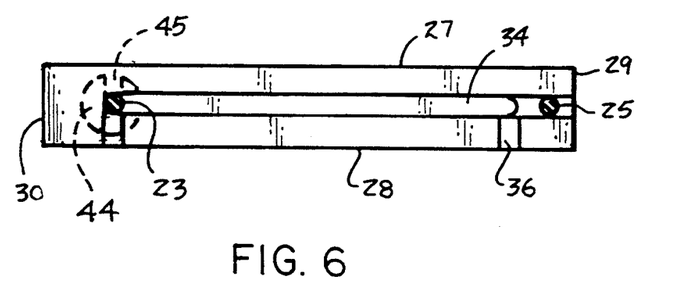
FIG. 6 is an orthographic view of the rotary lock plate structure arranged in a latched position with the tailgate in a second position.
Figure 7:
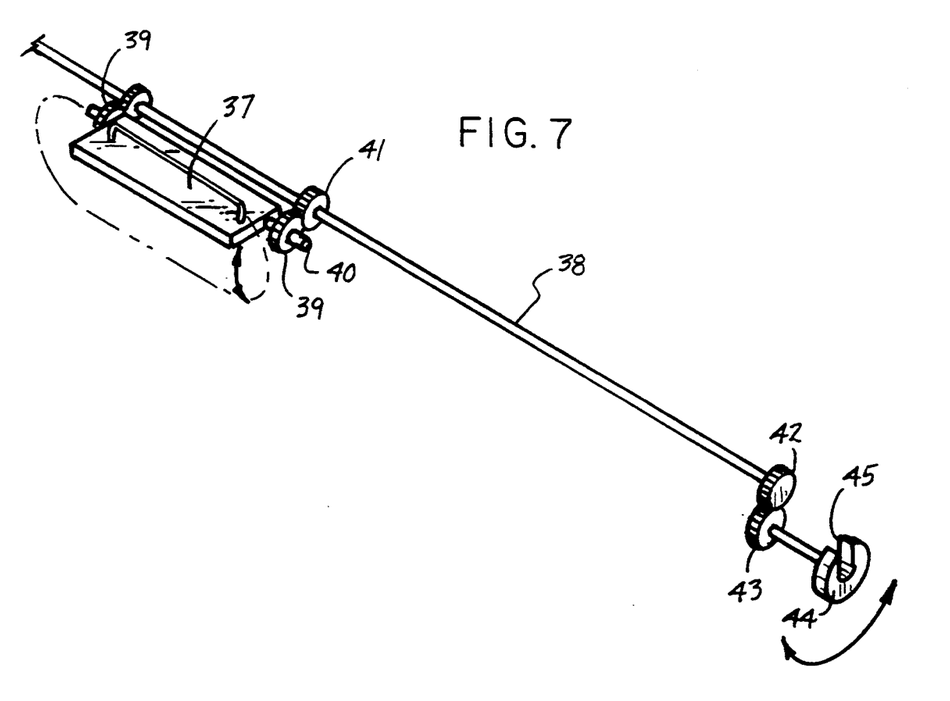
FIG. 7 is an isometric partial view of the gear drive structure arranged to operate the lock plates of the invention within the tailgate.

More specifically, the turbulence-reducing truck tailgate apparatus 10 of the instant invention essentially comprises cooperation with a truck bed 11, having a truck bed floor 12, including truck bed first and second side walls 13 and 14, having first and second vertical panel 15 and 16 extending to first and second horizontal panels 18 and 19. An entrance opening 17 is directed between the vertical panels 15 and 16, with the horizontal panels 18 and 19 arranged in a facing relationship relative to one another coextensively relative to one another extending over the truck bed floor 12. First and second pins 20 and 21 that are coaxially aligned are orthogonally mounted in the first and second panels 15 and 16 in adjacency to the floor 12, while third and fourth pins 22 and 23 are orthogonally mounted to the respective first and second vertical panels 15 and 16 in a spaced relationship relative to the floor 12 in adjacency to the first and second horizontal panels 18 and 19. Fifth and sixth pins 24 and 25 that are coaxially aligned are mounted in respective first and second horizontal panels 18 and 19. A tailgate plate 26 is provided, having a plate front wall 27 spaced from a rear wall 28, a top wall 29 spaced from a bottom wall 30, as well as respective plate first and second side walls 31 and 32. First and second L-shaped slots 33 and 34 are directed into the tailgate plate 26 from the first and second side walls 31 and 32, with the first and second L-shaped slots 33 and 34 extending along the respective first and second side walls 31 and 32 originating and in communication with the tailgate rear wall 28 extending from the rear wall 28 at that entrance opening projecting to the tailgate plate top wall 29. First and second connecting slots 35 and 36 orthogonally intersect the respective first and second L-shaped slots 33 and 34 and are oriented in adjacency relative to the top wall 29. In this manner, the tailgate is arranged for mounting to the respective first through fourth pins 20-22 inclusively in the first position, as illustrated in FIG. 1, and mounted to the third through sixth pins 22-25 inclusively in a second horizontal position, as indicated in FIG. 2, and mounted to the first and second pins 20-21 in a third position as indicated in FIG. 3. Mounted for access through the front wall 27, is pivoting latch plate 37 (as indicated in FIGS. 1, 2, and 7 for example), with the latch plate 37 having fixedly mounted thereto first drive gear axles 40 mounting respective first drive gears 39, with the first drive gears 39 arranged in communication with respective second drive gears 41 that in turn are secured to the control axle 38. At each end of the control axle 38 are respective third gears 42 that cooperate with fourth gears 43, that in turn are mounted in operative communication with a respective one of the first and second lock plates 44 and 46 (see FIG. 1) that are mounted in adjacency relative to the tailgate plate bottom wall 30 in adjacency to respective first and second side walls 31 and 32. The respective first and second lock plates 44 and 46 include respective first and second slots 45 and 47, wherein the slots 45 when orthogonally oriented between the front and rear walls 27 and 28 are arranged to latch the respective first and second pins 20 and 21 in the first position, and when rotated such that the lock plate slots 45 and 47 are oriented such that the slots 45 and 47 are in facing relationship relative to the rear wall 28, aligns the slots such that the pins 20 and 21 are released from the first and second respective lock plates 44 and 46, as opposed to the respective first and second slots 45 and 47 arranged in a facing relationship relative to the front wall 27 when the lock pins are secured preventing displacement of the tailgate plate. In this manner, the facing of the lock plates, and more specifically, the first and second slots 45 and 47 to permit release of the first pins 20 and 21 and reception of the third and fourth pins 22 and 23 within the first and second slots 45 and 47, as indicated in FIG. 5, is availed upon rotation of the lock plates upon lifting of the latch plate 37.

Figure 8:
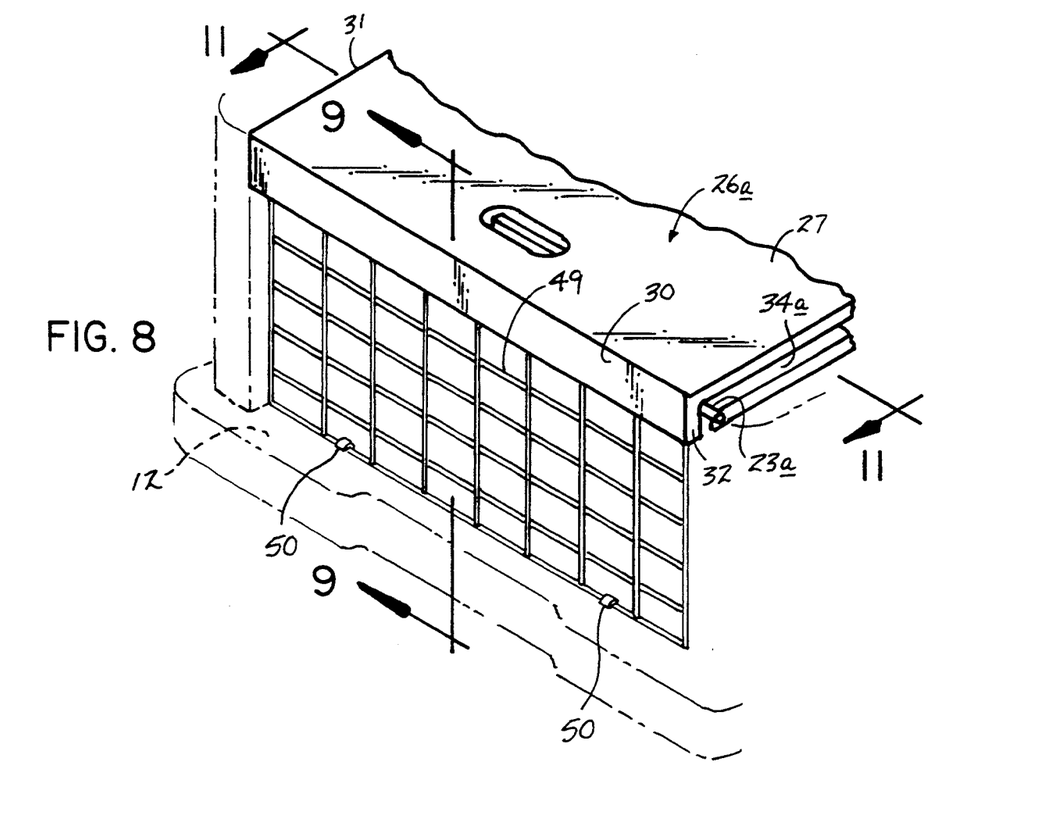
FIG. 8 is an isometric illustration of the invention including a retractable net member.
Figure 9:
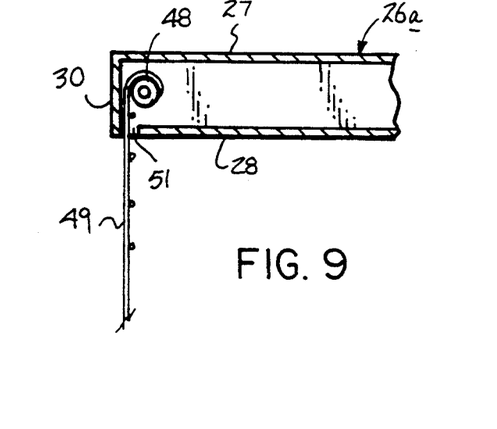
FIG. 9 is an orthgraphic view taken along the lines 9—9 of FIG. 8 in the direction indicated by the arrows.

The FIGS. 8 and 9 indicate the use additionally of a modified tailgate plate 26, having a rear wall opening 51 extending between the tailgate plate sides 31 and 32 in adjacency to the bottom wall 30 for the retraction of a net member 49 through the rear wall opening 51 from about a retraction roll 48 within the tailgate plate. The retraction roll 48 typically is of spring-biased construction to withdraw the net member 49 within the tailgate plate, whereupon the tailgate being in a second position, as indicated in FIG. 8, permits mounting of the net member 49 to support hooks 50 mounted to the truck bed floor 12. The net member functions as a cargo net to secure cargo within the truck bed.

Figure 10:
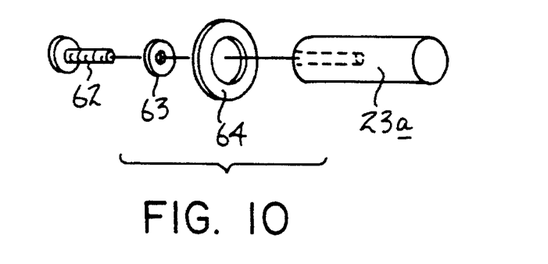
FIG. 10 is an isomtric exploded view of a modified forth pin.
Figure 11:
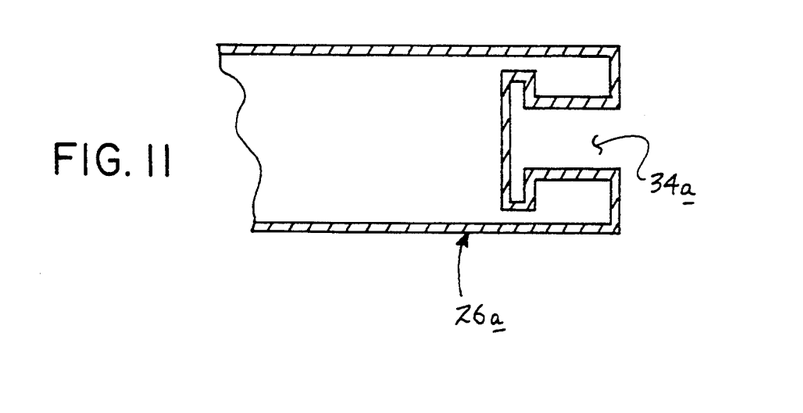
FIG. 11 is and orthographic cross-sectional view taken along the lines 11—11 of FIG. 8 in the direction indicated by the arrows.
Figure 12:
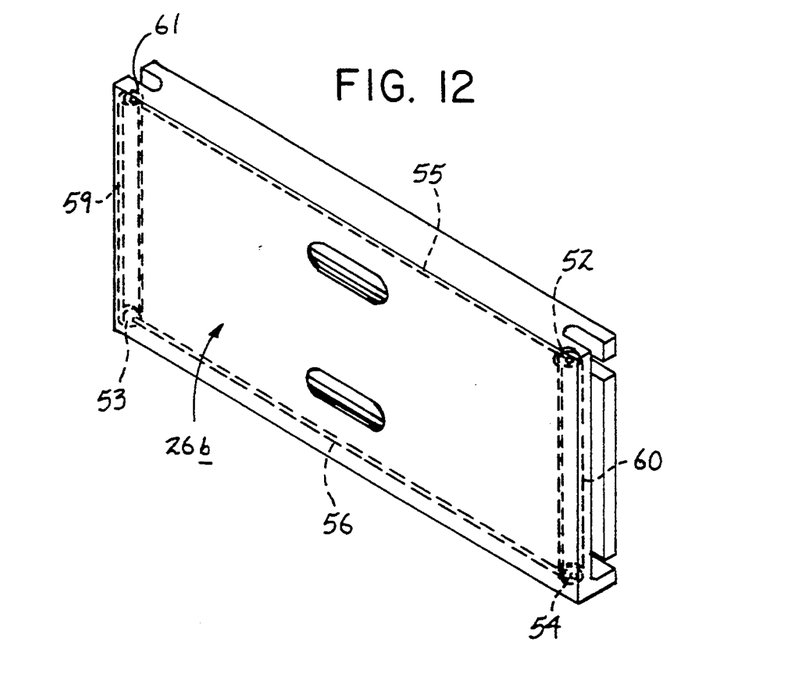
FIG. 12 is and isometric view of a tailgate plate containing a mechanism for maintaining proper alignment of the tailgate while the tailgate is being moved from the first position to the second position and vice versa.
Figure 13:
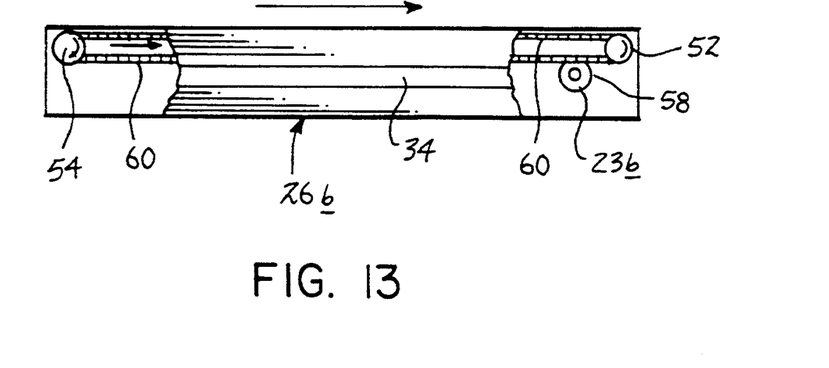
FIG. 13 is an orthographic partial broken-away view showing a chain loop and sprockets as included in the self-alignment mechanism.

FIGS. 10 and 11 indicate the use alternatively a modified forth pin 23a and L-shaped slot 34a wherein flange 64 is secured to one end of the forth pin 23a by screw 62. A bearing 63 allows the flange 64 to rotate around the screw 62 with the screw 62 serving as an axle. (See FIG. 10). Additionally, the modified L-shaped slot 34a has a T-shape when viewed in cross-section (See FIG. 11). The modified forth pin 23a fits into this slot 34a (See FIG. 8). The third pin 22 and the L-shaped slot 33 (See FIG. 3) may be similarly modified, with the result that the tailgate 26 is prevented from coming off of the pins 22 and 23 while in transit between the first position and the second position (FIG. 1 and 2).

Figure 14:
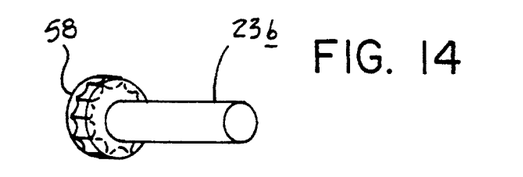
FIG. 14 is an isometric view of a modified forth pin with attached sprocket.
Figure 15:
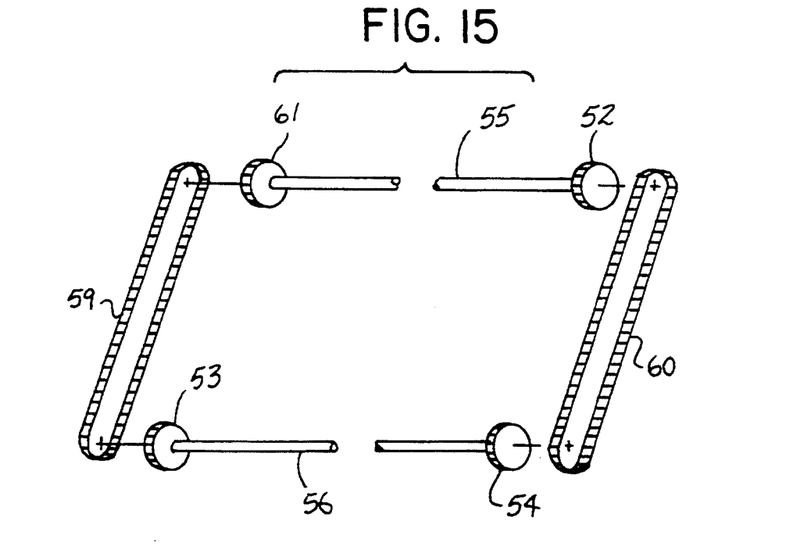
FIG. 15 is an isometric exploded view of the axle, sprocket and chain loop structure included in the self-aligning mechanism.

FIGS. 12-15 inclusively indicate the alternative use of a modified forth pin 23b and tailgate 26b wherein a sprocket 58 is affixed coaxially to the forth pin 23b in such a way as to prevent sprocket 58 from rotating (See FIG. 14). The third pin 22 (See FIG. 3) may be similarly modified and referred to as 22b. The modified tailgate 26b (See FIG. 12) includes a mechanism whose purpose is to keep the tailgate in proper alignment relative to the truck bed side walls 13 and 14 (FIG. 1) while the tailgate is in transit between the first and second positions (FIGS. 1 and 2). This alignment device includes a rotatable axle shaft 55 upon which are mounted coaxially sprocket 61 at one end and sprocket 52 at the other end, a rotatable axle shaft 56 upon which are mounted coaxially sprocket 53 at one end and sprocket 54 at the other end, a chain loop 60 which engages sprockets 52 and 54, and a chain loop 59 which engages sprockets 61 and 53 (See FIG. 15). Pin 23b with its' stationary or non-rotating sprocket 58 engages one side of chain loop 60 when tailgate 26b is in position 1 and position 2 and especially when the tailgate is in transit between position 1 and position 2 (See FIG. 13). Pin 22b with its' non-rotating sprocket engages one side of chain loop 59 when tailgate 26b is in position 1 and position 2 and especially when the tailgate is in transit between positions 1 and 2. Consequently when tailgate 26b is in transit or being moved between positions 1 and 2 the stationary sprocket 58 affixed to pin 23b serves as a fixed point for engaging one side of chain loop 60 (See FIG. 13). When the tailgate is moved in the direction indicated by the arrow, the free side of chain loop 60 is forced to move in the direction indicated by the arrow. This movement of chain loop 60 causes the sprockets 52 and 54 to rotate as shown by the arrows (See FIG. 13). Because sprocket 52 is connected by axle 55 to sprocket 61 and sprocket 54 is connected by axle 56 to sprocket 53, the chain loop 59 must move in unison wish chain loop 60 (See FIGS. 12 and 15). Pin 22b with its' stationary sprocket serves as a fixed point for engaging one side of chain loop 59 in the same manner as pin 23b and sprocket 58 relate to chain loop 60. As a result, any force used while moving the tailgate 26b between positions 1 and 2 will be transmitted equally to both sides of the tailgate. Tailgate 26b is thereby automatically kept in proper alignment relative to the truck bed side walls 13 and 14 (FIG. 1) while the tailgate is in transit between positions 1 and 2, preventing the tailgate from binding or jamming in a mis-aligned orientation between the truck bed side walls while the tailgate is being moved from position 1 to position 2 and vice versa.

As to the manner of usage and operation of the instant invention, the same should be apparent from the above disclosure, and accordingly no further discussion relative to the manner of usage and operation of the instant invention shall be provided.

With respect to the above description then, it is to be realized that optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turbulence-reducing truck tailgate apparatus arranged in combination with a truck cargo bed having a truck bed floor, a truck bed first side wall spaced from a truck bed second side wall, and an entrance opening oriented between said first side wall and said second side wall, and a tailgate of sufficient size to cover or close said entrance opening, and latch means whereby said tailgate may be secured to said truck bed in a first position and a second position, and whereby said tailgate may be partially released so as to rest in a third position, said first position being a vertical orientation covering said entrance opening of said truck bed, said second position being a horizontal orientation substantially forward of said first position, said third position being a horizontal orientation substantially rearward of said first position and in the same plane as said truck bed floor, and including means for maintaining proper alignment of said tailgate plate in relation to said truck bed while said tailgate plate is in transit between said first position and said second position, and a truck bed, having a truck bed floor, a truck bed first side wall spaced from a truck bed second side wall, with said truck bed first side wall and said truck second side wall including a first vertical panel spaced from, parallel to, and coextensive with a second vertical panel orthogonally intersecting said truck bed floor, and a first horizontal panel and a second horizontal panel arranged in a facing coextensive relationship mounted to the respective truck bed first side wall and truck bed second side wall, and an entrance opening oriented between said first vertical panel and said second vertical panel, and a first pin and a second pin fixedly and orthogonally mounted to the respective first vertical panel and second vertical panel in adjacency to said truck bed floor, wherein said first pin and said second pin are coaxially aligned relative to one another, with a third pin and a fourth pin mounted to the respective first vertical panel and second vertical panel, with said third pin and said fourth pin coaxially aligned relative to one another spaced from the respective first pin and second pin, with said third pin and said fourth pin positioned in adjacency relative to said first horizontal panel and said second horizontal panel respectively, with a fifth pin mounted to said first horizontal panel spaced from said third pin, and a sixth pin fixedly and orthogonally mounted to said second horizontal panel spaced from said fourth pin, wherein said fifth pin and said sixth pin are coaxially aligned relative to one another, and a tailgate plate having a front wall spaced from a rear wall, a top wall spaced from a bottom wall, and a plate first side wall spaced from a plate second side wall, with a first L-shaped slot directed into said tailgate plate into said plate first side wall, and a second L-shaped slot directed into said plate into said plate second side wall, with said first L-shaped slot and said second L-shaped slot originating in communication with said rear wall and extending to said top wall, with a first connecting slot extending from said rear wall intersecting said first L-shaped slot in adjacency to said top wall, and a second connecting slot extending from said rear wall in adjacency to said top wall intersecting said second L-shaped slot, with said first L-shaped slot arranged slidably receive said first pin, said third pin, and said fifth pin, with said second L-shaped slot arranged to receive slidably said second pin, said fourth pin, and said sixth pin permitting displacement of said tailgate plate from a first position mounted between said first vertical panel and said second vertical panel permitting displacement of said tailgate plate to a second position extending between said first horizontal panel and said second horizontal panel and to a third position located in the same plane as said truck bed floor.

2. An apparatus as set forth in claim 1 including latch means for respective securement of the tailgate plate to the first position and to the second position, wherein said latch means includes a first rotary lock plate mounted within said first L-shaped slot in adjacency to said bottom wall for selective securement of said first pin and said third pin, with a second rotary lock plate mounted within said second L-shaped slot for selective reception of said second pin and said fourth pin.

3. An apparatus as set forth in claim 2 wherein said latch means further includes a pivoting latch plate directed through said rear wall, wherein the latch plate includes first drive gears fixedly mounted relative to said latch plate, with said first drive gears including first drive gear axles, and a control axle oriented parallel to said first drive gear axles in adjacency to said latch plate, wherein said control axle includes second drive gears in operative communication with said first drive gears, and third drive gears mounted to opposed distal ends of said control axle, and fourth drive gears in operative communcation with said third drive gears, with one of said fourth drive gears mounted in fixed communication with said first rotary lock plate, and one of said fourth drive gears mounted in fixed communication to said lock plate.

4. An apparatus as set forth in claim 3 wherein said first lock plate includes a first slot, said second lock plate having a second slot, and said first slot arranged to selectively receive said first pin and said third pin, with said second slot arranged to receive selectively said second pin and said fourth pin.

5. An apparatus as set forth in claim 1 including a retraction roll mounted within the tailgate in adjacency to said bottom wall, and a rear wall opening positioned in adjacency to said retraction roll and to said bottom wall, with said retraction roll having a net member wound thereabout, with said net member arranged for projection from said rear wall opening, and a plurality of support hooks mounted to said truck bed floor for securing said net member, wherein said net member is extended from said tailgate plate when said tailgate plate is in said second position.

6. The apparatus of claim 1 wherein said third pin and said fourth pin each posess a flange at one end.

7. The apparatus of claim 1 wherein said first L-shaped slot and said second L-shaped slot are T-shaped when viewed in cross-section.

8. The apparatus of claim 1, further including means for maintaining proper alignment of said tailgate plate in relation to said truck bed while said tailgate plate is in transit between said first position and said second position.

9. The apparatus of claim 8 wherein a first non-rotatable or stationary sprocket is affixed coaxially to said third pin, and a second non-rotatable or stationary sprocket is affixed coaxially to said fourth pin.

10. The apparatus of claim 9 wherein said tailgate plate further includes a first rotatable axle shaft mounted substantially within said tailgate plate in adjacency to said top wall, a first rotatable sprocket affixed to one end of said first rotatable axle shaft, a second rotatable sprocket affixed to the other end of said first rotatable axle shaft, a second rotatable axle shaft mounted substantially within said tailgate plate in adjacency to said bottom wall, a third rotatable sprocket affixed to one end of said second rotatable axle shaft in correspondency to said first rotatable sprocket, a fourth rotatable sprocket affixed to the other end of said second rotatable axle shaft in correspondency to said second rotatable sprocket, a first chain engaging and forming a closed loop around said first rotatable sprocket and said third rotatable sprocket, and a second chain engaging and forming a closed loop around said second rotatable sprocket and said fourth rotatable sprocket.

* * * * *